Nov. 23, 1971     A. E. VELTHOVEN     3,621,502
METHOD AND APPARATUS FOR PRODUCING LOCKNUTS
Filed July 22, 1969
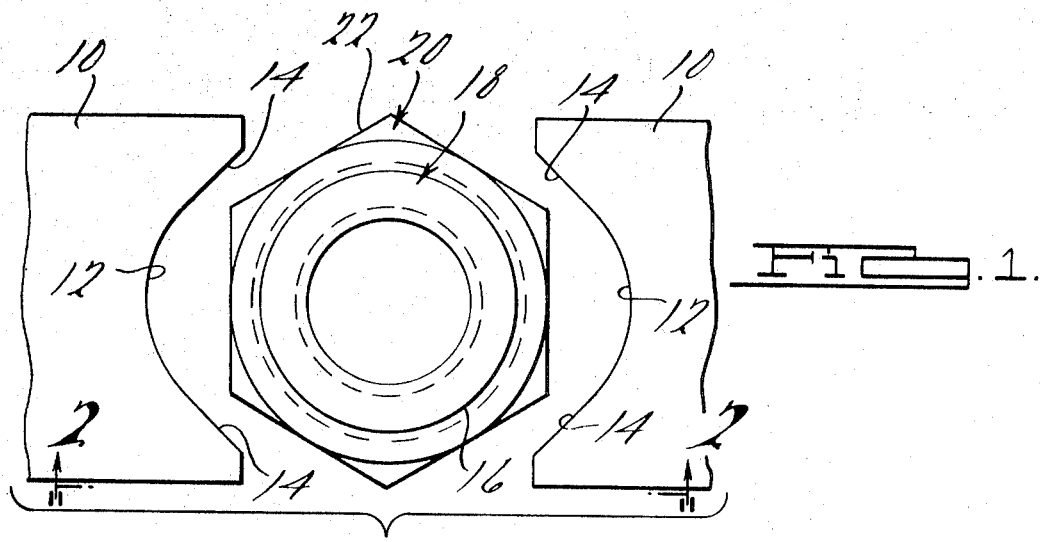
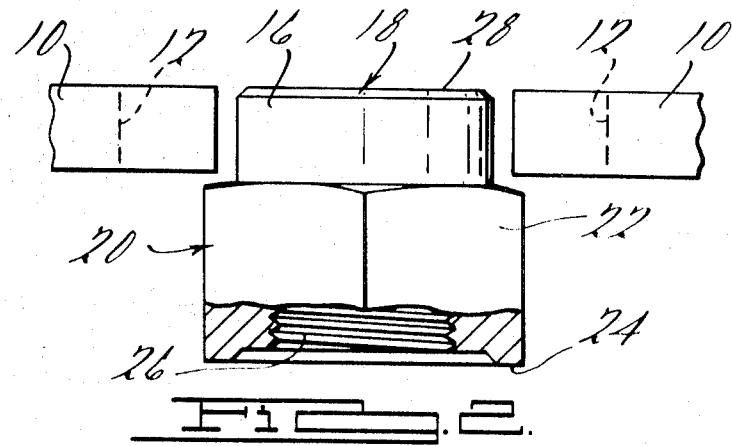
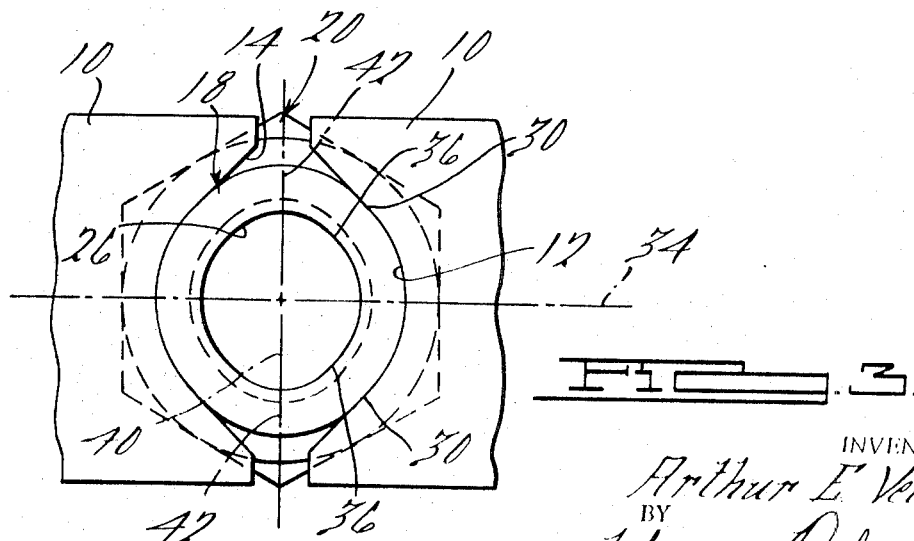
INVENTOR.
Arthur E. Velthoven
BY
Harness, Dickey & Pierce
ATTORNEYS

United States Patent Office 3,621,502
Patented Nov. 23, 1971

3,621,502
METHOD AND APPARATUS FOR PRODUCING LOCKNUTS
Arthur E. Velthoven, Warren, Mich., assignor to Federal Screw Works, Detroit, Mich.
Filed July 22, 1969, Ser. No. 843,637
Int. Cl. B21d *53/24;* B21k *1/64;* B23g *9/00*
U.S. Cl. 10—72                              6 Claims

ABSTRACT OF THE DISCLOSURE

A method and apparatus for manufacturing collar type locknuts in which the nut collar is squeezed between a pair of opposed indentors. The collar engaging indentor surfaces are concave or segmentally cylindrical in shape. By this means relatively large areas of the collar are displaced inwardly a uniform amount and the frictional locking force is distributed over a large thread area.

BACKGROUND OF THE INVENTION

Prevailing torque locknuts made entirely from steel have been known for many years. Such locknuts are made by first cold-forming and then tapping a nut body. The nut body is then subjected to a deforming operation designed to displace one or more localized thread areas radially inwardly of the normal thread diameter. One type of such locknuts, which has been well accepted, is the "collar" locknut. Collar locknuts have an annular collar at one end of the nut body which is thinner than the main wall portions of the nut. In the deforming operation, only the collar is squeezed. Due to its thinner wall section, the collar is relatively easy to deform without excessively distorting the remaining portion of the nut.

In the manufacture of collar type locknuts, it has been customary to pass the collar of a nut body between a pair of indenting rollers or to squeeze the collar between a pair of flat indentor surfaces. Such prior collar locknuts have been satisfactory for various applications, particularly when used on high quality bolts or where the required prevailing torque is relatively low. However, where a high degree of prevailing torque is required, or where the stud on which the nut is used is made from a relatively soft metal, the results have not been satisfactory. In such uses major problems of galling the male threads have been encountered. An example is the nut which positions the rocker arm in an automotive gasoline engine. At least one automobile manufacturer using locknuts for this application has established a prevailing torque requirement of 55 to 125 inch pounds. This high prevailing torque is required because the nut is not tightened against a resting surface. The nut is made from a class C material and is used on a grade 5 bolt. With this combination, it has been found to be virtually impossible to produce a locknut meeting such high torque value requirements without stripping the threads of the bolt in a large percentage of cases. In fact, it was found that 20% of the prior locknuts, indented with flat indentors, stripped the threads of the bolt upon the first application. With repeated applications of the nut, the threads of virtually 100% of the bolt were stripped. An analysis of this and similar problem areas has demonstrated a need for a locknut which will yield the desired high torque value, but which will not destroy or seriously damage the male threads on which it is used.

SUMMARY OF THE INVENTION

The present invention is intended to produce a locknut which has relatively large thread areas for gripping and frictionally locking against the stud. On the other hand, the deformation of the collar, measured in a radial direction, is less than that of prior collar locknuts designed to yield the same torque values.

The apparatus of the present invention includes a pair of opposed indentors having concave working surfaces which conformably contact the collar to displace the adjacent thread areas inwardly without destroying their arcuate shape. This causes other areas of the collar, between the indentations, to bow outwardly and the collar assumes a more truly elliptical cross-sectional shape than has been previously achieved. In prior methods of indenting collar locknuts, radially outward displacement of the collar in the areas intermediate the indentations was minimal, if it occurred at all. Prior deforming operations produced relatively small, flattened thread indentations to grip the stud. A collar squeezed according to the present invention is better able to "breath" or flex as it is thread onto the stud.

Locknuts made according to the present invention have been found to overcome the problems of prior collar locknuts and are satisfactory for a wider range of uses than any other all steel prevailing torque locknut known to applicant. Applicant's locknuts will consistently meet a relatively high yet narrow torque range requirement. Of particular importance, the locknuts exhibit no tendency to gall or damage the male threads on which the nut is used. The collar exhibits an outstanding ability to return to its elliptical shape when it is removed from the stud. The process and apparatus are inexpensive, yet afford an excellent measure of control over the nut's torque rating.

DESCRIPTION OF THE VIEWS OF THE DRAWINGS

FIG. 1 is a plan view of the apparatus of the present invention and a nut body to be squeezed with such apparatus;

FIG. 2 is an elevational view of the structure illustrated in FIG. 1; and

FIG. 3 is a view of the structure, illustrated in FIG. 1 but with the indentor dies shown closed on the nut collar and the collar squeezed to its final shape.

DESCRIPTION OF THE ILLUSTRATED EMBODIMENT

Referring now to the drawings, FIGS. 1 and 2 show a pair of opposed dies 10, each of which has a segmentally circular cylindrical, concave working surface 12. The die surfaces 12 merge with flat dies surfaces 14 tangential to the surface 12. The surfaces 12 are arranged in oppositely facing relation and contact the outer periphery 16 of the collar 18 of a locknut body 20. The collar 18 is of annular configuration and its outer periphery 16 is initially of circular cylindrical shape, as shown in FIG. 1. The locknut body 20 has six wrench receiving side walls 22 arranged in a regular polygonal configuration. A recessed seat 24 is located at the end of the body 20 opposite from the collar 18. A threaded bore 26 extends through the body 20 from the seat 24 to an upper surface 28 of the collar 18.

Looking at FIG. 3 it is to be noted that the segmentally circular cylindrical die surfaces 12 are centered on an axis 34. The nut body 20, which has been previously tapped, is placed between the dies 10, with the axis of its bore 26 intersecting the axis 34, as shown in FIG. 1. The dies 10 are moved relatively toward one another along the axis 34 so as to engage the collar outer periphery 16 on diametrically opposite sides thereof. In practice, one of the dies 10 may remain stationary as the other die 10 is moved, if the nut body 20 is free to float along the axis 34. The collar is thus squeezed between the die surfaces 12 and deformed to an elliptical cross-sectional shape as shown in FIG. 3. The circumferential extent of each die surface 12 is denoted by the lead lines of the numerals 30 in FIG. 3. It will be seen that the surfaces 12, which have the same radii as the periphery 16, span an arc of 90 degrees. During the squeezing operation, initial die contact with the collar 18 is made by the surface 12 only. However, as the squeezing progresses some contact of the die surfaces 14 is made with the collar. The thread of the bore 26 is radially inwardly displaced in two opposite areas extending circumferentially a distance slightly greater than 90°, as indicated by the lead lines of the numerals 36 in FIG. 3.

The ellipse defined by the deformed collar 18 has a major axis 40 lying between the indentors 10 perpendicular to the axis 34 and bisecting diametrically opposite portions 42 of the collar 18 which are displaced in a radially outward direction during collar deforming operation. Prior to shipment, the nut is, of course, washed and waxed in accordance with standard prevailing torque locknut manufacturing practices. The nut may also be heat treated.

A dimensional analysis of two groups of ⅜" collar nuts squeezed according to the present invention and according to the prior art will serve to highlight significant aspects of the present invention. Identical nut bodies 20 were used for both groups. The collar outer periphery 16 has a diameter of .530 inch. In the practice of the present invention the collar was squeezed to an average width across its minor diameter (e.g., along the axis 34) of .513 inch. This squeeze resulted in an expansion of the collar along its major axis 40 to an average width of approximately .545. When the collar was indented in accordance with the prior art in order to yield the same torque rating it was necessary to squeeze the collar to a minimum average width of about .497, while the average maximum width along an axis at right angles to the indentation varied from the original O.D. of the collar to .540 inch. Both nuts were designed to meet prevailing torque standards of 50 to 125 inch pounds.

Collar nuts of the above size designed for the previously mentioned rocker arm usage when indented with flat indentor dies or passed between rollers would strip the threads of the studs in 20% of the cases upon the first installation, as was mentioned previously. Substantially 100% of such prior art nuts would strip the threads of the stud after five applications. With the nut of the present invention fifteen installations on the stud did not destroy the stud threads in any of the tests conducted. Furthermore, it was found that the nuts manufactured in accordance with the present invention fell into a narrower torque range than nuts made according to the prior art.

Analyzing the deformation of the collar in the above described ⅜" locknuts it will be noted that a radial extent of the deformation is practically twice as great when the collar is deformed in accordance with the prior art than when deformed in accordance with the present invention. This, of course, is a comparison of locknuts designed to produce the same locking torque. Furthermore, the prior art method resulted in only minor expansion of the collar along an axis disposed at right angles to the axis or line of movement of the dies. The prior art did not tend to produce a collar having as truly an elliptical configuration but, rather, tended to distort the collar in localized areas. Accordingly, the entire collar of the prior art locknuts did not breathe or expand and contract to the same degree as locknuts made according to the present invention.

It will be noted that the die surfaces 12 have the same radius as the collar periphery 16. It is believed, however, that some variations in the radius of the surfaces 12 can be made and still achieve the benefits of the present invention. While each die surface 12 contacts the collar periphery 16 over an arc of 90°, the dies 10 will tend to displace an area of the threaded bore 26 which is somewhat greater than 90°. As the dies 10 move relatively toward one another the collar outer periphery 16 will be displaced inwardly somewhat by the flat surfaces 14. The amount of indenting action achieved by the surfaces 14 is slight, however, and they mainly serve to provide a smooth transition between the radially inwardly deformed and radially outwardly bowed areas of the collar 18. While the total area of the collar 18 which is contacted by each die 10 may vary with respect to the angular dimensions illustrated herein it is preferred to contact at least 45° of the periphery 16 with each die.

What is claimed is:

1. The method of manufacturing a collar type locknut including the steps of forming a nut body having a thread bore extending between its opposite ends and a collar disposed at one end of said body in surrounding relation to said bore, said collar being provided with a circular cylindrical outer periphery and squeezing said collar between a pair of dies by opposed movement of said dies along an axis transverse to said bore, each of said dies having a segmentally cylindrical indenting surface concentric to said transverse axis and conforming to said collar outer periphery, said indenter surfaces being effective to make initial indenting contact with the collar periphery over an arc greater than 45° and less than 180°.

2. The method set forth in claim 1 in which said indenter surfaces each contact about 90° of the collar outer periphery.

3. The method set forth in claim 1 in which said dies each have a pair of flat surfaces tangential to said indenter surfaces and blending with said indenter surfaces the opposite ends thereof, portions of said flat surfaces being operable to contact the collar outer periphery subsequent to contact of said indenter surfaces therewith.

4. Die apparatus for squeezing the collars of collar locknut blanks including a pair of concave die members supported for movement toward and away from one another along a given axis, each of said die members having a continuous segmentally cylindrical indenter surface concentric to said axis and arranged to contact the collar of a locknut blank positioned between said dies, said indenter surfaces having an arcuate length greater than 45° and less than 180°.

5. The structure set forth in claim 4 in which said indenter surfaces have an arcuate length of about 90°.

6. The structure set forth in claim 4 including a pair of flat surfaces on each of said die members tangential to said indenter surfaces and blending with said indenter surfaces at the opposite ends thereof.

References Cited

UNITED STATES PATENTS

| | | | |
|---|---|---|---|
| 3,431,959 | 3/1969 | Beebe et al. | 10—86 |
| 3,352,342 | 11/1967 | Jacobson | 151—21 |
| 3,433,280 | 3/1969 | Reusser | 151—21 |
| 3,459,249 | 8/1969 | Jordan et al. | 151—21 |
| 3,496,582 | 2/1970 | Johnson | 10—86 |

FOREIGN PATENTS

| | | | |
|---|---|---|---|
| 823,644 | 11/1959 | Great Britain | 151—21 |
| 840,578 | 7/1960 | Great Britain | 10—86 |

CHARLES W. LANHAM, Primary Examiner

E. M. COMBS, Assistant Examiner

U.S. Cl. X.R.

10—85, 86; 151—21